US011897290B2

(12) United States Patent
Meguro (10) Patent No.: US 11,897,290 B2
(45) Date of Patent: Feb. 13, 2024

(54) TIRE

(71) Applicant: Sumitomo Rubber Industries, Ltd., Kobe (JP)

(72) Inventor: Yuya Meguro, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/960,348

(22) Filed: Oct. 5, 2022

(65) Prior Publication Data

US 2023/0125290 A1    Apr. 27, 2023

(51) Int. Cl.
| | |
|---|---|
| *B60C 11/12* | (2006.01) |
| *B60C 11/13* | (2006.01) |
| *B60C 11/01* | (2006.01) |
| *B60C 11/03* | (2006.01) |

(52) U.S. Cl.
CPC ............ *B60C 11/125* (2013.01); *B60C 11/01* (2013.01); *B60C 11/1369* (2013.01); *B60C 11/1392* (2013.01); *B60C 11/0304* (2013.01); *B60C 2011/0381* (2013.01)

(58) Field of Classification Search
CPC ............ B60C 11/1369; B60C 11/1353; B60C 11/1392; B60C 2011/0369
See application file for complete search history.

(56) References Cited

U.S. PATENT DOCUMENTS

| | | | | |
|---|---|---|---|---|
| 2015/0258858 | A1* | 9/2015 | Kujime | ............... B60C 11/1392 |
| | | | | 152/209.8 |
| 2015/0273949 | A1* | 10/2015 | Arai | ........................ B60C 11/13 |
| | | | | 152/209.18 |
| 2016/0101655 | A1* | 4/2016 | Shibayama | ......... B60C 11/1323 |
| | | | | 152/209.18 |
| 2017/0050470 | A1 | 2/2017 | Kanematsu | |
| 2017/0267029 | A1* | 9/2017 | Nagase | ................... B60C 11/04 |
| 2021/0155049 | A1* | 5/2021 | Koike | ................. B60C 11/0304 |

FOREIGN PATENT DOCUMENTS

JP    2017-39407 A    2/2017

* cited by examiner

*Primary Examiner* — Cedrick S Williams
*Assistant Examiner* — Nicholas J Weiler
(74) *Attorney, Agent, or Firm* — Birch, Stewart, Kolasch & Birch, LLP (57) ABSTRACT

A tire includes a tread portion including a first tread edge, a first shoulder circumferential groove, and a first shoulder land portion demarcated by the first shoulder circumferential groove to include the first tread edge. The first shoulder land portion is provided with first shoulder lateral grooves extending from the first shoulder circumferential groove to the first tread edge. One of the first shoulder lateral grooves includes first and second groove walls which face each other, and a tie-bar. The tie-bar includes an outer surface extending along a ground contact surface of the first shoulder land portion, the outer surface being connected to the first and second groove walls. The outer surface includes a first edge connected to the first groove wall, and a second edge connected to the second groove wall, the second edge having a length smaller than a length of the first edge.

17 Claims, 7 Drawing Sheets

TIRE

RELATED APPLICATIONS

This application claims the benefit of foreign priority to Japanese Patent Application No. JP2021-174924, filed Oct. 26, 2021, which is incorporated by reference in its entirety.

FIELD OF THE DISCLOSURE

The present disclosure relates to a tire.

BACKGROUND OF THE DISCLOSURE

For example. Patent Document 1 below has proposed a tire provided with first shoulder lateral grooves having tie-bars in which groove bottom surfaces raise locally. The tire is expected to increase the rigidity of a first shoulder land portion by the tie-bars and improve driving performance on dry road surfaces.

PATENT DOCUMENT

[Patent document 1] Japanese Unexamined Patent Application Publication 2017-039407

SUMMARY OF THE DISCLOSURE

In recent years, with the improvement of vehicle performance, it has been required to further improve steering stability of tires on dry road surfaces (hereinafter, may be simply referred to as "steering stability").

The present disclosure has been made in view of the above circumstances and has a major object to provide a tire capable of improving steering stability.

In one aspect of the present disclosure, a tire includes a tread portion including a first tread edge, a first shoulder circumferential groove extending in a tire circumferential direction adjacent to the first tread edge, and a first shoulder land portion demarcated by the first shoulder circumferential groove to include the first tread edge. The first shoulder land portion is provided with a plurality of first shoulder lateral grooves extending from the first shoulder circumferential groove to at least the first tread edge. At least one of the plurality of first shoulder lateral grooves includes a first groove wall and a second groove wall which face each other and extend in a tire radial direction, and a tie-bar in which a groove bottom portion raises locally. The tie-bar includes an outer surface extending along a ground contact surface of the first shoulder land portion, the outer surface being connected to the first groove wall and the second groove wall. The outer surface includes a first edge connected to the first groove wall, and a second edge connected to the second groove wall, the second edge having a length smaller than a length of the first edge.

DETAILED DESCRIPTION OF THE DISCLOSURE

Hereinafter, one or more embodiments of the present disclosure will be described with reference to the drawings.

Figure 1:
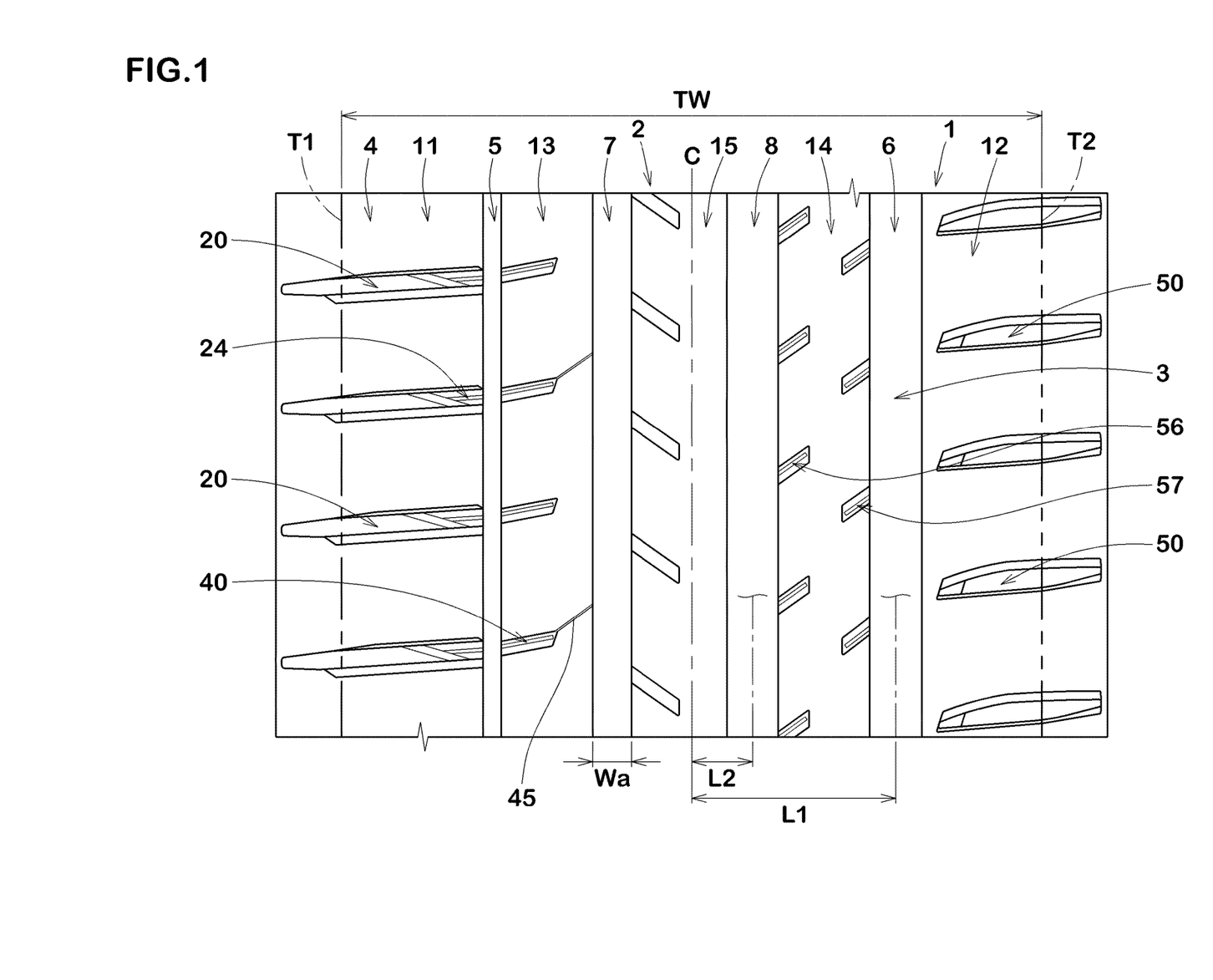
FIG. 1 is a development view of a tread portion of a tire according to an embodiment of the present disclosure.

FIG. 1 is a development view of a tread portion 2 of a tire 1 showing an embodiment of the present disclosure. The tire 1 according to the present embodiment, for example, is suitably used as a pneumatic tire for passenger car. However, the present disclosure is not limited to such an embodiment, and may be applied to a pneumatic tire for heavy load and a non-pneumatic tire in which the inside of the tire is not filled with pressurized air.

As illustrated in FIG. 1, the tread portion 2 of the tire 1 includes a first tread edge T1, a second tread edge T2, a plurality of circumferential grooves 3 extending continuously in the tire circumferential direction between the first and second tread edges T1 and T2, and a plurality of land portions 4 demarcated by the plurality of circumferential grooves 3. The tire 1 according to the present embodiment is a so-called five-land tire in which the tread portion 2 is composed of four circumferential grooves 3 and five land portions 4. However, the present disclosure is not limited to such an aspect. The tire 1 according to another embodiment of the present disclosure, for example, may be a so-called four-land tire in which the tread portion 2 is composed of three circumferential grooves 3 and four land portions 4.

In the present embodiment, the tread portion 2 has a designated mounting direction to vehicles. In this embodiment, the first tread edge T1 is intended to be located on the outside of a vehicle when mounted on the vehicle, and the second tread edge T2 is intended to be located on the inside of a vehicle when mounted on the vehicle. However, the present disclosure is not limited to such an aspect.

The first tread edge T1 and the second tread edge T2 are the axial outermost edges of the ground contacting patch of the tire 1 which occurs under the condition such that the tire 1 under a normal state is grounded on a plane with a standard tire load at zero camber angles.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is anon-pneumatic tire, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the "Tire Load Limits at Various Cold Inflation Pressures" in TRA, and the "Load Capacity" in ETRTO, for example. For tires for which various standards have not been established, "standard tire load" refers to the maximum load applicable to the tire.

The circumferential grooves 3 include a first shoulder circumferential groove 5. The first shoulder circumferential groove 5 is arranged adjacent to the first tread edge T1. Further, in the present embodiment, the circumferential grooves 3 include a second shoulder circumferential groove 6, a first crown circumferential groove 7, and a second crown circumferential groove 8. The second shoulder circumferential groove 6 is arranged adjacent to the second tread edge T2. The first crown circumferential groove 7 is arranged between the first shoulder circumferential groove 5 and the tire equator C. The second crown circumferential groove 8 is arranged between the second shoulder circumferential groove 6 and the tire equator C.

It is preferable that a distance L1 in the tire axial direction from the tire equator C to each of groove centerlines of the first shoulder circumferential groove 5 and the second shoulder circumferential groove 6, for example, is of from 25% to 35% of the tread width TW. It is also preferable that a distance L2 in the tire axial direction from the tire equator C to each of groove centerlines of the first crown circumferential groove 7 and the second crown circumferential groove 8, for example, is of from 5% to 20% of the tread width TW. Note that the tread width TW is the distance in the tire axial direction from the first tread edge T1 to the second tread edge T2 in the normal state.

In the present embodiment, each of the circumferential grooves 3, for example, extends linearly parallel to the tire circumferential direction. Each of the grooves 3, for example, may extend in a wavy shape.

A groove width Wa of each of the circumferential grooves 3 is preferably at least 3 mm. Further, the groove width Wa of each the circumferential grooves 3 is preferably in a range from 3.0% to 5.0% of the tread width TW. As a more preferred embodiment, in the present embodiment, the first shoulder circumferential groove 5 has the smallest groove width among the plurality of the circumferential grooves 3. However, the present disclosure is not limited to such an aspect.

The land portions 4 includes a first shoulder land portion 11. The first shoulder land portion 11 includes the first tread edge T1, and is disposed outwardly in the tire axial direction of the first shoulder circumferential groove 5. In addition, the land portions 4 according to the present embodiment include a second shoulder land portion 12, a first middle land portion 13, a second middle land portion 14, and a crown land portion 15. The second shoulder land portion 12 includes the second tread edge T2, and is disposed outwardly in the tire axial direction of the second shoulder circumferential groove 6. The first middle land portion 13 is disposed between the first shoulder circumferential groove 5 and the first crown circumferential groove 7. The second middle land portion 14 is disposed between the second shoulder circumferential groove 6 and the second crown circumferential groove 8. The crown land portion 15 is disposed between the first crown circumferential groove 7 and the second crown circumferential groove 8.

Figure 2:
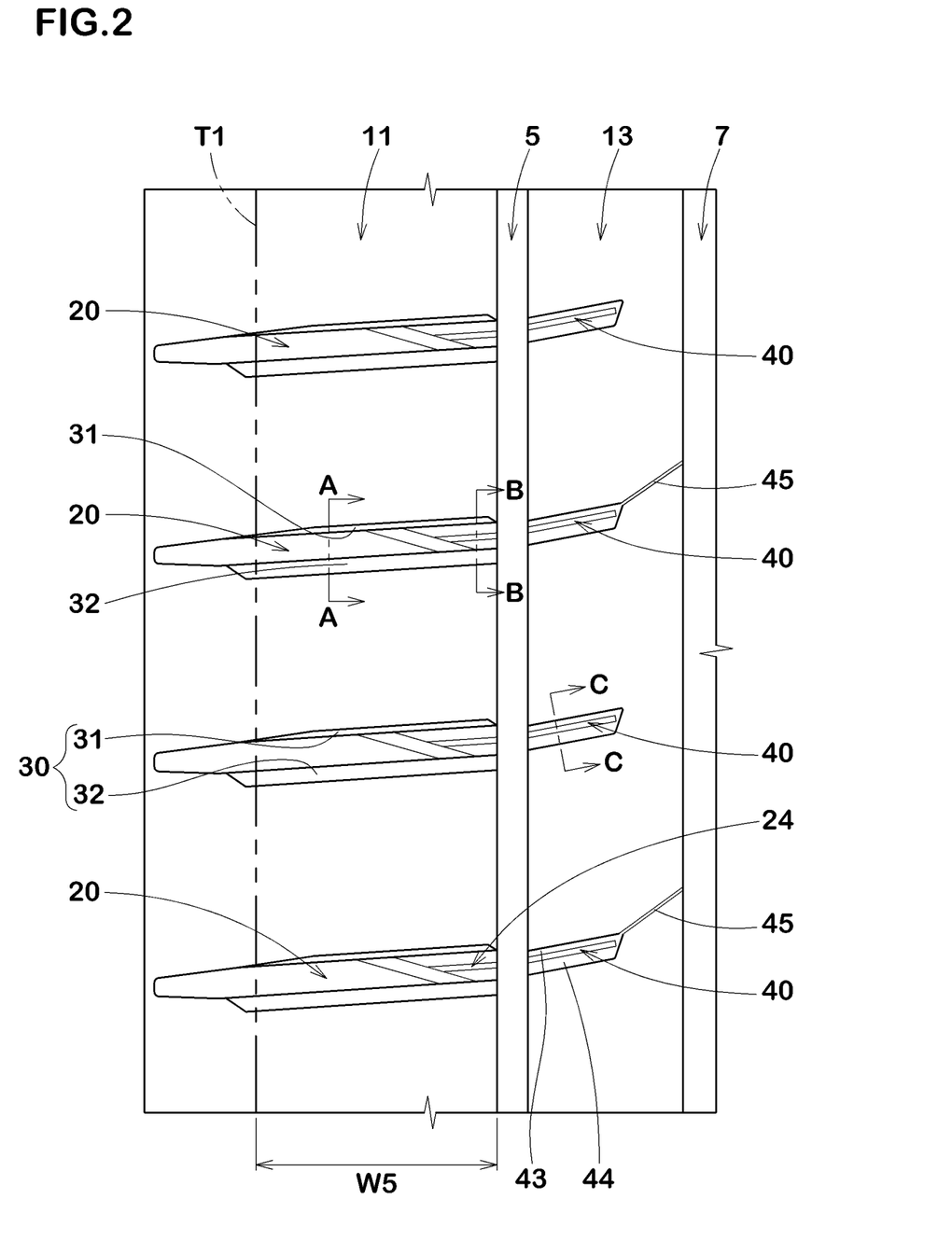
FIG. 2 is an enlarged view of a first shoulder land portion and a first middle land portion in FIG. 1.

FIG. 2 illustrates an enlarged view of the first shoulder land portion 11 and the first middle land portion 13. As illustrated in FIG. 2, the first shoulder land portion 11 is provided with a plurality of first shoulder lateral grooves 20 extending from the first shoulder circumferential groove 5 to at least the first tread edge T1. In the present embodiment, the first shoulder lateral grooves 20 extend beyond the first tread edge T1.

Figure 3:
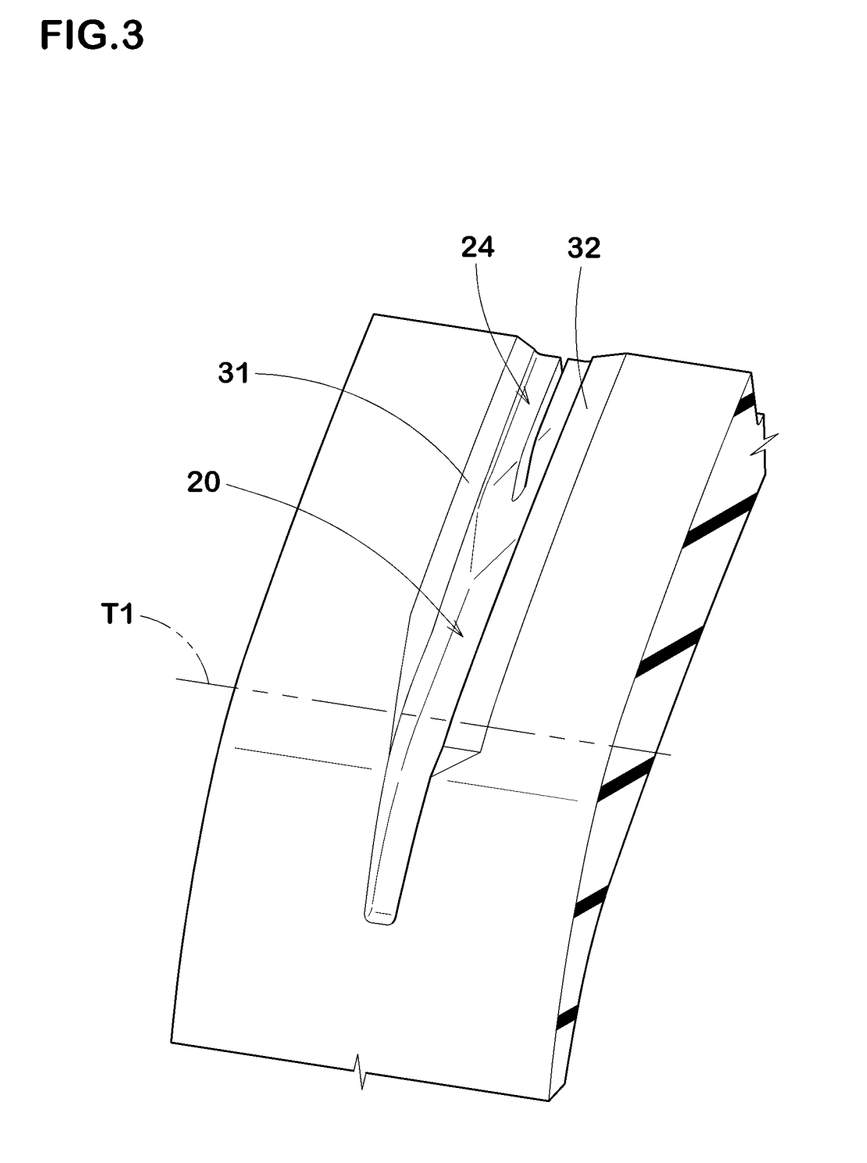
FIG. 3 is an enlarged perspective view of a first shoulder lateral groove in FIG. 2.
Figure 4:
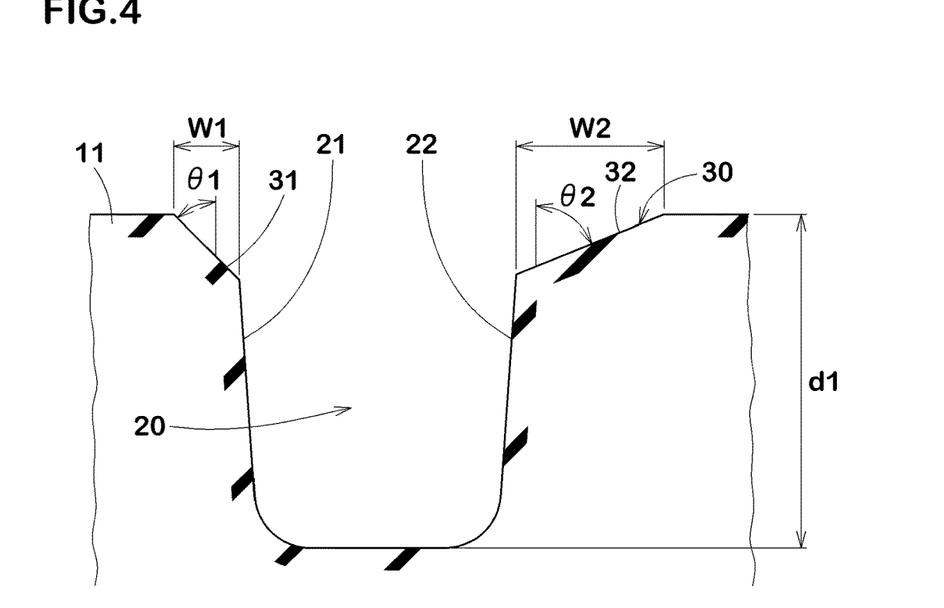
FIG. 4 is a cross-sectional view taken along the line A-A of FIG. 2.

FIG. 3 illustrates an enlarged perspective view of one of the first shoulder lateral grooves 20. FIG. 4 illustrates a cross-sectional view taken along the line A-A of FIG. 2. As illustrated in FIG. 3 and FIG. 4, at least one of the first shoulder lateral grooves 20 includes a first groove wall 21 and a second groove wall 22 which face each other and extend in the tire radial direction, and a tie-bar 24 in which a groove bottom portion raises locally. In the present embodiment, the first groove wall 21 is located on a first side in the tire circumferential direction of the first shoulder lateral groove 20 (e.g., corresponding to the upper side in FIG. 2), and the second groove wall 22 is located on a second side in the tire circumferential direction of the first shoulder lateral groove 20 (e.g., corresponding to the lower side in FIG. 2).

Figure 5:
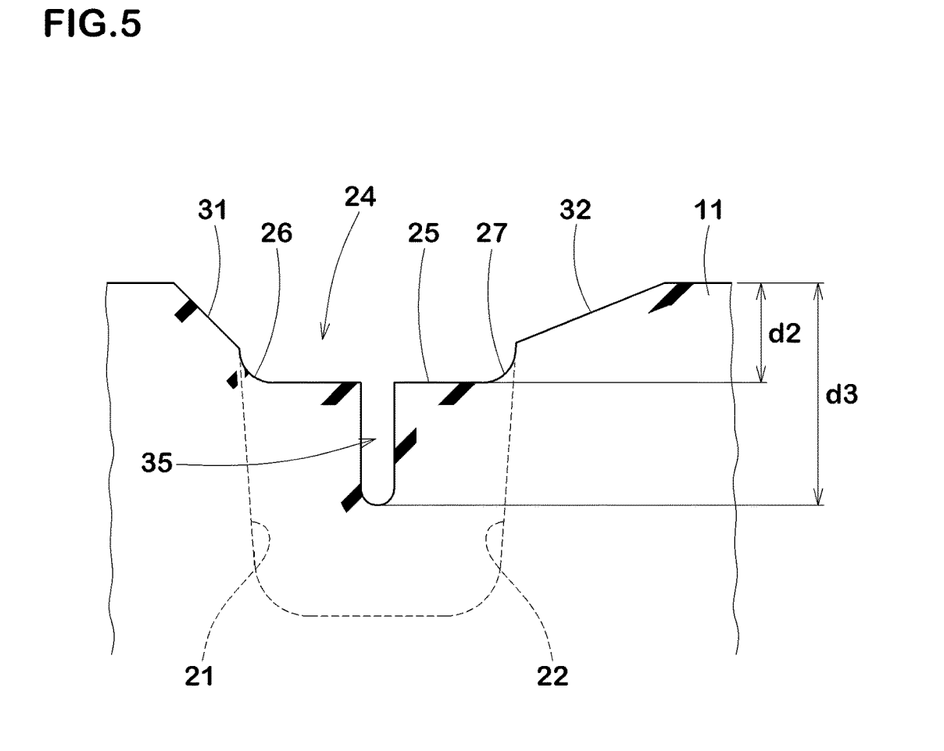
FIG. 5 is a cross-sectional view taken along the line B-B of FIG. 2.
Figure 6:
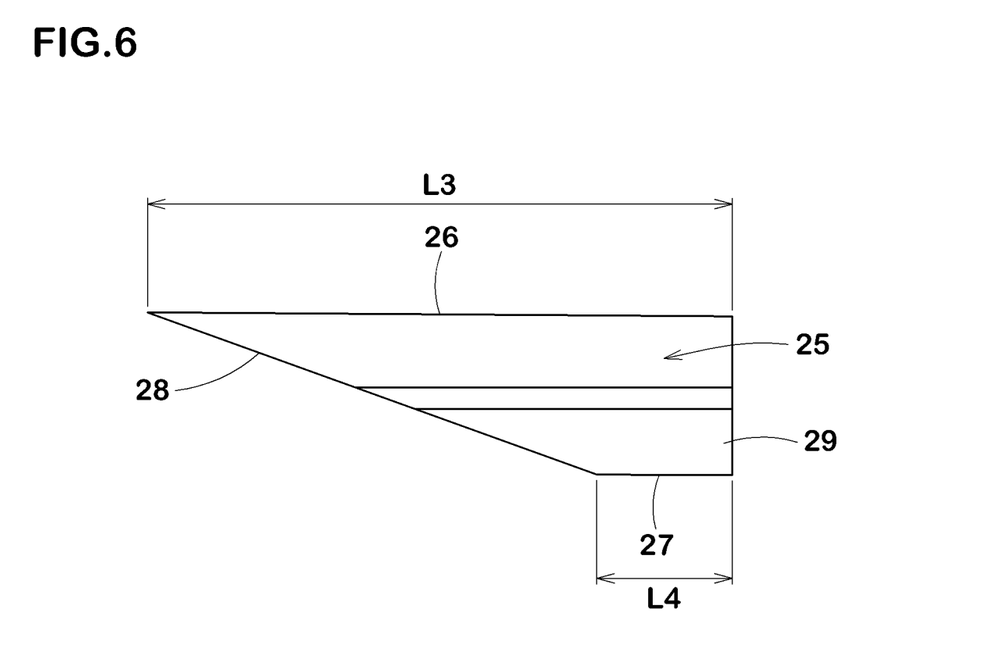
FIG. 6 is an enlarged plan view of a tie-bar.

FIG. 5 illustrates a cross-sectional view taken along the line B-B of FIG. 2. As illustrated in FIG. 5, the tie-bar 24 includes an outer surface 25 extending along a ground contact surface of the first shoulder land portion 11, and the outer surface 25 is connected to the first groove wall 21 and the second groove wall 22. FIG. 6 illustrates an enlarged plan view of the outer surface 25. As illustrated in FIG. 6, the outer surface 25 includes a first edge 26 connected to the first groove wall 21, and a second edge 27 connected to the second groove wall 22. The first edge 26 and the second edge 27 are boundaries between the outer surface 25 and a respective one of the first groove wall 21 and the second groove wall 22. When the outer surface 25 is connected to the first groove wall 21 or the second groove wall 22 via a curved surface, the boundary is the intermediate position of the curve constituting the curved surface in a cross section of the first shoulder lateral groove 20.

The second edge 27 has a length L4 smaller than a length L3 of the first edge 26. The tire 1 according to the present disclosure can improve steering stability by adopting the above configuration. The reason can be inferred as follows, for example.

In the present disclosure, by providing the tie-bar 24 in the at least one first shoulder lateral groove 20, the rigidity of the first shoulder land portion 11 can be improved, and it is expected that the steering stability can be improved.

As a result of diligent research, the inventors have found that the conventional tie bar could exert the effect of improving the rigidity of the tread land portion, but the ground contact surface of the land portion was slightly distorted around the tie-bar, and the ground pressure around the tie bar became non-uniform.

In order to make the above-mentioned ground pressure uniform, in the present disclosure, the length L4 of the second edge 27 of the outer surface 25 of the tie-bar 24 is set smaller than the length L3 of the first edge 26. As a result, moderate deformation can be expected on the second groove wall 22 side where the second edge 27 is connected, and the ground pressure acting around the tie-bar can be made uniform. Thus, a large gripping force can be exhibited in the area around the tie-bar, and further improvement in steering stability can be expected. Such an effect cannot be realized only by adjusting the length of the conventional tie bar, but can be realized by facing the second edge 27, which promotes appropriate deformation, with the first edge 26, which has a high rigidity improving effect. That is, the tire 1 according to the present disclosure can significantly improve the steering stability as compared with tires having a conventional tie-bar.

Hereinafter, a more detailed configuration of the present embodiment will be described. Note that each configuration described below shows a specific aspect of the present embodiment. Thus, the present disclosure can exert the above-mentioned effects even if it does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 2, the first shoulder lateral grooves 20 have substantially the same configuration. Further, the first shoulder lateral grooves 20, for example, are inclined at a small angle with respect to the tire axial direction. The angle of the first shoulder lateral grooves 20 with respect to the tire axial direction, for example, is equal to or less than 15 degrees.

As illustrated in FIG. 4, the maximum depth d1 of the first shoulder lateral grooves 20 is in a range from 80% to 100% of the maximum depth of the first shoulder circumferential groove 5 (shown in FIG. 2). Such first shoulder lateral grooves 20 can exert a good balance between steering stability and wet performance.

As illustrated in FIG. 2 and FIG. 3, it is preferable that each tie-bar 24 is arranged inwardly in the tire axial direction from the center position in the tire axial direction of the ground contact surface (the surface between the first tread edge T1 and the first shoulder circumferential groove 5) of the first shoulder land portion 11. As a more preferred embodiment, each tie-bar 24 of the present embodiment is provided on the end of each first shoulder lateral groove 20 on the first shoulder circumferential groove 5 side. Such a tie-bar 24 can help to improve steering stability.

As illustrated in FIG. 5, a depth d2 from the ground contact surface of the first shoulder land portion 11 to the outer surface 25 of the tie-bar 24 is preferably in a range from 20% to 40% of the maximum depth d1 of the first shoulder lateral grooves 20 (shown in FIG. 4). This can improve steering stability and wet performance in a well-balanced manner.

As illustrated in FIG. 6, in a tread plan view, the outer surface 25 of each tie-bar 25 preferably has a trapezoidal shape. That is, the outer surface 25 has a quadrilateral shape surrounded by the first edge 26 and the second edge 27 which extend parallel to each other, and a third edge 28 and a fourth edge 29 which extend non-parallel to each other. The third edge 28 is located on the first tread edge T1 (shown in FIG. 2) side, and the fourth edge 29 is located on the first shoulder circumferential groove 5 (shown in FIG. 2) side. However, the outer surface 25 of the present disclosure is not limited to such an aspect.

The length L3 of the first edge 26 and the length L4 of the second edge 27 are preferably in a range from 10% to 50% of a width W5 in the tire axial direction of the ground contact surface of the first shoulder land portion 11 (shown in FIG. 2). The length L4 of the second edge 27 is preferably equal to or more than 20% of the length L3 of the first edge 26, more preferably equal to or more than 30%, but preferably equal to or less than 60%, more preferably equal to or less than 50%. By setting the relationship between the length L3 and the length L4 in this way, the third edge 28, for example, is inclined at an angle of from 10 to 30 degrees with respect to the tire axial direction. The fourth edge 29 extends along the tire circumferential direction. The outer surface 25 which has the edges defined in this way can improve the stiffness of the first shoulder land portion 11 and make the ground pressure uniform, further improving steering stability.

An area of the outer surface 25 of each tie-bar 25 is preferably equal to or more than 10% of an opening area of each first shoulder lateral groove 20 (shown in FIG. 2) between the first tread edge T1 and the first shoulder circumferential groove 5, more preferably equal to or more than 20%, but preferably equal to or less than 40%, more preferably equal to or less than 30%. This can improve steering stability and wet performance in a well-balanced manner.

As illustrated in FIG. 2 and FIG. 4, it is preferable that one or more first shoulder lateral grooves 20 may include chamfer portions 30. The chamfer portions 30 include inclined surfaces formed between the ground contact surface of the first shoulder land portion 11 and the groove walls. Such chamfer portions 30 can help to further improve the uniformity of the ground pressure.

The inventors have found that the size of the inclined surfaces of the chamfer portions 30 were specified according to the lengths of the first edge 26 and the second edge 27 of the outer surface 25, and the above-mentioned effect could be further improved. Based on such findings, the chamfer portions 30 according to the present embodiment include a first inclined surface 31 extending from the ground contact surface of the first shoulder land portion 11 to the first groove wall 21, and a second inclined surface 32 extending from the ground contact surface to the second groove wall 22, and in a tread plan view the maximum width W2 of the second inclined surface 32 is greater than the maximum width W1 of the first inclined surface 31. As a result, the second inclined surface 32 with a large width is provided on the side of the second groove wall 22, which is easily deformed. Thus, the second inclined surface 32 can come into contact with the ground due to the deformation of the second groove wall 22, and the steering stability can further be improved.

The width W1 of the first inclined surface 31, for example, is in a range from 1.0 to 1.5 mm. The width W2 of the second inclined surface 32, for example, is in a range from 2.5 to 3.5 mm. When the second inclined surface 32 is excessively small, it becomes difficult to obtain the above effects. When the second inclined surface 32 is excessively large, the ground contact surface of the first shoulder land portion 11 becomes small, which may impair steering stability. From this point of view, the width W2 of the second inclined surface 32 is preferably equal to or more than 1.5 times the width W1 of the first inclined surface 31, more preferably equal to or more than 2.0 times, but preferably equal to or less than 3.5 times, more preferably equal to or less than 3.0 times.

An angle θ1 of the first inclined surface 31, for example, is in a range from 35 to 55 degrees with respect to a tire normal line. An angle θ2 of the second inclined surface 32 with respect to a tire normal line is greater than the angle θ1. For example, the angle θ2 is in a range from 60 to 75 degrees. However, the disclosure is not limited to such an aspect.

As illustrated in FIG. 5, at least one of the first shoulder lateral grooves 20 is provided with a groove bottom sipe 35 opening at the outer surface 25. A depth d3 from the ground contact surface of the first shoulder land portion 11 to a bottom of the groove bottom sipe 35, for example, is in a range from 50% to 80% of the maximum depth d1 of the first shoulder lateral groove 20 (shown in FIG. 4). Such a groove bottom sipe 35 can help to maintain the drainage of the first shoulder lateral groove 20. As used herein, "sipe" means an incision having a width of from 0.5 to 1.5 mm.

As illustrated in FIG. 2, the first middle land portion 13 is provided with a plurality of first middle shallow grooves 40. The first middle shallow grooves 40, for example, extend from the first shoulder circumferential groove 5 and terminate within the first middle land portion 13. Such first middle shallow grooves 40 can help to maintain the rigidity of the first middle land portion 13 and enhance steering stability.

Preferably, the first middle shallow grooves 40 are in communication with the first shoulder circumferential groove 5 at positions close to the respective first shoulder lateral grooves 20. In particular, it is preferable that areas where the ends of the respective first shoulder lateral grooves 20 on the first shoulder circumferential groove 5 side are extended parallel to the tire axial direction overlap more than 50% of the groove widths of the ends of the respective first middle shallow grooves 40 on the first shoulder circumferential grooves 5 side. Such an arrangement of the first shoulder lateral grooves 20 and the first middle shallow grooves 40 can help to improve wet performance.

Figure 7:
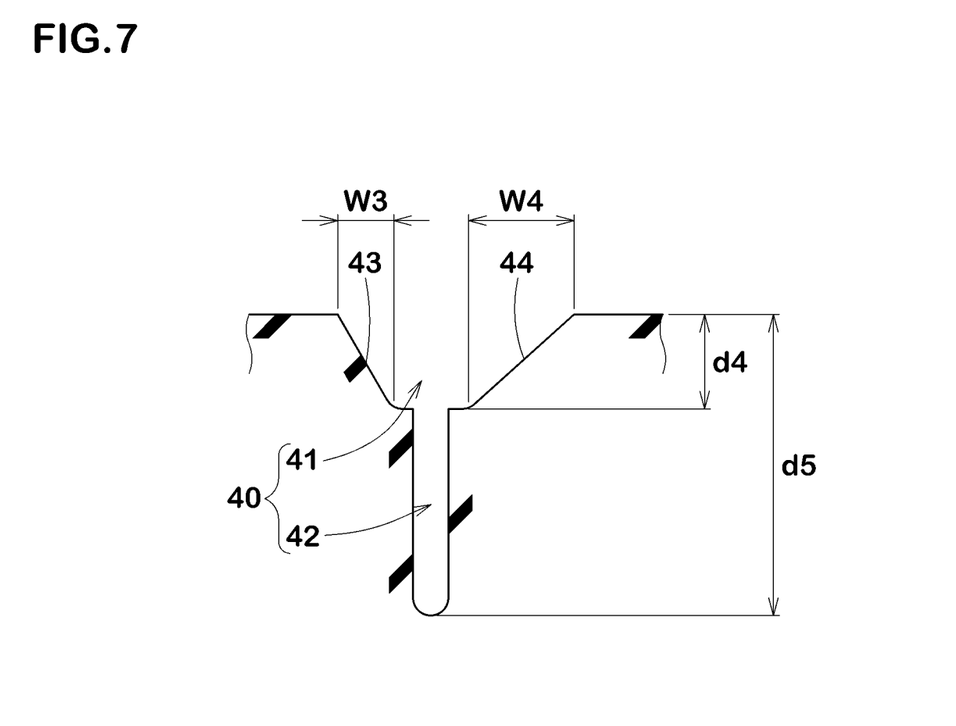
FIG. 7 is a cross-sectional view taken along the line C-C of FIG. 2.

FIG. 7 illustrates a cross-sectional view taken along the line C-C of FIG. 2. As illustrated in FIG. 7, in the present embodiment, each first middle shallow groove 40 includes a main portion 41 and a middle groove-bottom sipe 42 extending inwardly in the tire radial direction from a groove bottom of the main portion 41. A depth d4 of the main portion 41, for example, is smaller than the depth d2 (shown in FIG. 5) from the ground contact surface of the first shoulder land portion 11 to the outer surface 25 of the tie-bar 24. Preferably, the depth d4 is in a range from 80% to 95% of the depth d2, for example. A total depth d5 of the first middle shallow grooves 40, for example, is in a range from 70% to 90% of the maximum depth d1 (shown in FIG. 4) of the first shoulder lateral grooves 20. Such first middle shallow grooves 40 can help to improve the balance between steering stability and wet performance.

The main portion 41 of each first middle shallow groove 40, for example, includes a first shallow groove wall 43 and a second shallow groove wall 44 which are different in width in a tread plan view. In a tread plan view, a width W4 of the second shallow groove wall 44 is greater than a width W3 of the first shallow groove wall 43. Specifically, the width W4 of the second shallow groove wall 44 is in a range from 1.3 to 2.0 times the width W3 of the first shallow groove wall 43.

In some preferred embodiments, as illustrated in FIG. 2, each first shallow-groove wall 43 is located on the first side in the tire circumferential direction of each first middle shallow groove 40, and each second shallow-groove wall 44 is located on the second side in the tire circumferential direction of each first middle shallow groove 40. As a result, the progress of wear can be made uniform in the first shoulder land portion 1I and the first middle land portion 13, and the uneven wear resistance performance can be improved.

Preferably, the first middle land portion 13 is provided with one or more connecting sipes 45 each extending from either one of the first middle shallow grooves 40 to the first crown circumferential groove 7. In the present embodiment, the first middle shallow grooves 40 with the connecting sipes 45 and the first middle shallow grooves 40 without the connecting sipes 45 are alternately arranged in the tire circumferential direction. The connecting sipes 45 can provide frictional force during wet driving while maintaining the rigidity of the first middle land portion 13.

Figure 8:
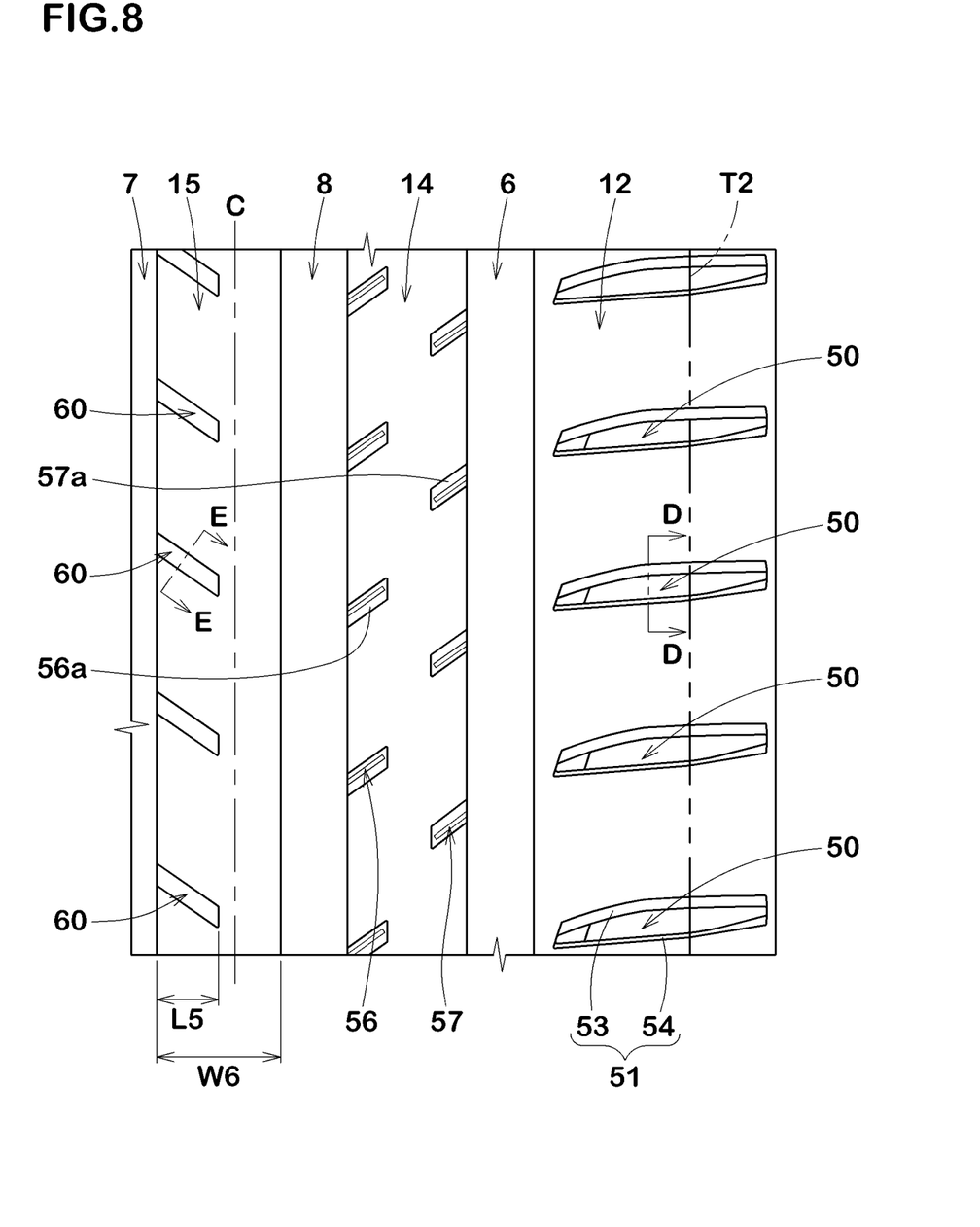
FIG. 8 is an enlarged view of a second shoulder land portion, a second middle land portion and a crown land portion of FIG. 1.

FIG. 8 illustrates an enlarged view of the second shoulder land portion 12, the second middle land portion 14 and the crown land portion 15. As illustrated in FIG. 8, the second shoulder land portion 12 is provided with a plurality of second shoulder lateral grooves 50. The second shoulder lateral grooves 50, for example, extend inwardly from at least the second tread edge T2 and terminate without reaching the second shoulder circumferential groove 6. Such second shoulder lateral grooves 50 can improve steering stability and wet performance in a well-balanced manner.

Figure 9:
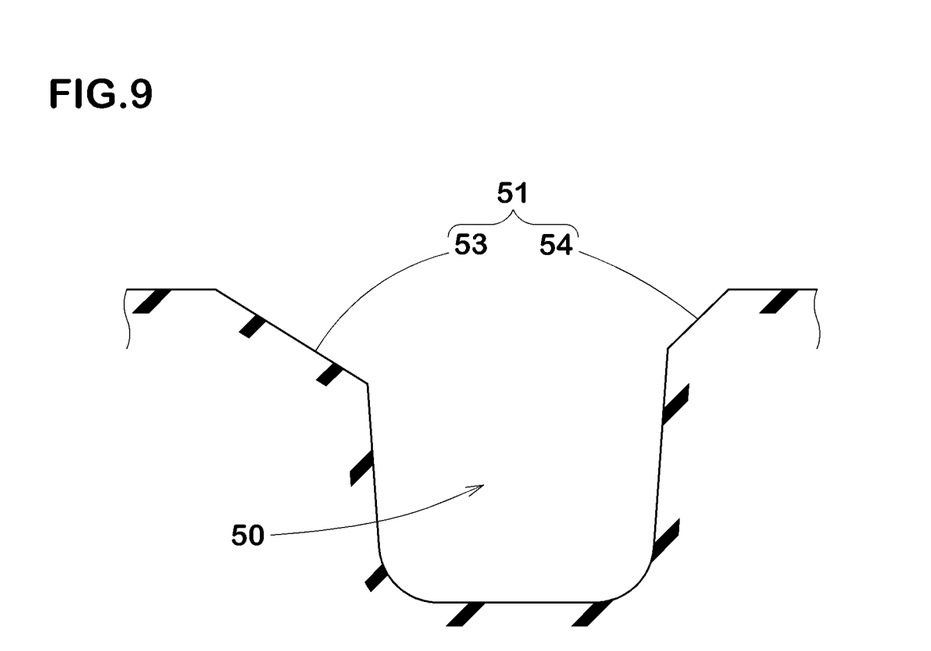
FIG. 9 is a cross-sectional view taken along the line D-D of FIG. 8.

FIG. 9 illustrates a cross-sectional view taken along the line D-D of FIG. 8. As illustrated in FIG. 9, one or more second shoulder lateral grooves 50 include chamfer portions 51. The chamfer portions 51 includes a third inclined surface 53 and a fourth inclined surface 54. In a tread plan view, a width of the third inclined surface 53 is greater than a width of the fourth inclined surface 54. The configuration of each second inclined surface 32 (shown in FIG. 4) of the first shoulder lateral grooves 20 described above can be applied to each third inclined surface 53. The configuration of each first inclined surface 31 (shown in FIG. 4) of the first shoulder lateral grooves 20 described above can be applied to each fourth inclined surface 54.

As illustrated in FIG. 8, each third inclined surface 53 is arranged on the first side in the tire circumferential direction of each second shoulder lateral groove 50, and the fourth inclined surface 54 is arranged on the second side in the tire circumferential direction of each second shoulder lateral groove 50. In other words, the first shoulder lateral grooves 20 and the second shoulder lateral grooves 50 are opposite in terms of the size relation of the width of the inclined surfaces of the chamfer portions. This can improve traction performance and braking performance on dry roads in a well-balanced manner.

The second middle land portion 14 is provided with a plurality of outer second middle shallow grooves 56 and a plurality of the inner second middle shallow grooves 57. The outer second middle shallow grooves 56 extend from the second crown circumferential groove 8 and terminate within the second middle land portion 14. The inner second middle shallow grooves 57 extend from the second shoulder circumferential groove 6 and terminate within the second middle land portion 14. The outer second middle shallow grooves 56 and the inner second middle shallow grooves 57 terminate within the second middle land portion 14 without crossing the tire axial center position of the second middle land portion 14. Such outer second middle shallow grooves 56 and inner second middle shallow grooves 57 can help to improve steering stability and wet performance in a well-balanced manner.

The outer second middle shallow grooves 56 and the inner second middle shallow grooves 57 each have substantially the same cross-sectional shape as the first middle shallow grooves 40 described above. Thus, the configuration of the cross-sectional shape of the first middle shallow grooves 40 shown in FIG. 7 can be applied to the outer second middle shallow grooves 56 and the inner second middle shallow grooves 57.

In each outer second middle shallow groove 56, the second shallow-groove wall 56a having a relative greater width is arranged on the second side in the tire circumferential direction. In each inner second middle shallow groove 57, the second shallow-groove wall 57a having a relative greater width is arranged on the first side in the tire circumferential direction. As a result, uneven wear of the second middle land portion 14 can be suppressed, and traction performance and braking performance on dry road surfaces can be improved in a well-balanced manner.

The crown land portion 15 is provided with a plurality of crown shallow grooves 60. The crown shallow grooves 60, for example, extend from the first crown circumferential groove 7 and terminate within the crown land portion 15. A length L5 in the tire axial direction of the crown shallow grooves 60, for example, is in a range from 40% to 60% of a width W6 in the tire axial direction of the crown land portion 15.

Figure 10:
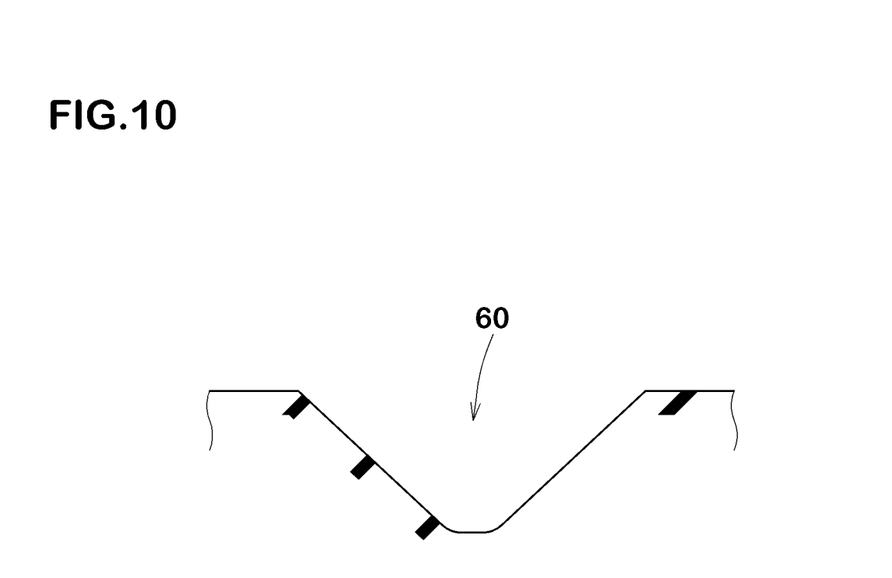
FIG. 10 is a cross-sectional view taken along the line E-E of FIG. 8.

FIG. 10 illustrates a cross-sectional view taken along the line E-E of FIG. 8. As illustrated in FIG. 10, the crown shallow grooves 60 are not provided with any groove-bottom sipes. Such crown shallow grooves 60 can help to maintain the rigidity of the crown land portion 15 and provide excellent steering stability.

While the particularly preferable embodiments of the tire in accordance with the present disclosure have been described in detail, the present disclosure is not limited to the illustrated embodiments, but can be modified and carried out in various aspects within the scope of the disclosure.

[Example]

Pneumatic tires, 235/35R19, with the basic tread pattern of FIG. 1 were prepared based on the specifications in Tables 1 to 2. As comparative examples 1 to 3, pneumatic tires in which the first edges and the second edges of the outer surfaces of the tie-bars provided in the first shoulder lateral grooves are the same length were also prepared. The tires of comparative examples 1 to 3 are substantially the same as the tires of the examples except for the above items. In addition, steering stability and wet performance of these test tires were tested. The common specifications and test methods are as follows.

Rim size: 17×8.0

Tire internal pressure: 260 kPa for all wheels

Test vehicle: Displacement 2000cc, front-wheel drive vehicle

Tire mounting position: All wheels

Steering Stability Test:

The steering stability when driving on a test course of a dry road surface with the above test vehicle was evaluated by the driver's sensuality. The test results are indicated using a score with the steering stability of comparative example 1 as 100, and the larger the value, the better the steering stability.

Wet Performance Test:

The wet performance when driving on a test course of a wet road surface with the above test vehicle was evaluated by the driver's sensuality. The test results are indicated using a score with the wet performance of comparative example 1 as 100, and the larger the value, the better the wet performance.

Tables 1 and 2 show the test results.

TABLE 1

|  | Ref. 1 | Ref. 2 | Ref. 3 | Ex. 1 | Ex. 2 | Ex. 3 | Ex. 4 | Ex. 5 |
|---|---|---|---|---|---|---|---|---|
| First edge length L3/first shoulder land portion width W5 (%) | 30 | 25 | 35 | 43 | 33 | 38 | 48 | 53 |
| Second edge length L4/first shoulder land portion width W5 (%) | 30 | 25 | 35 | 17 | 7 | 12 | 22 | 27 |
| First inclined surface width W1 (mm) | 1.3 | 1.3 | 1.3 | 1.3 | 1.3 | 1.3 | 1.3 | 1.3 |
| Second inclined surface width W2 (mm) | 3.0 | 3.0 | 3.0 | 3.0 | 3.0 | 3.0 | 3.0 | 3.0 |
| Steering stability (score) | 100 | 99 | 102 | 110 | 106 | 108 | 110 | 111 |
| Wet performance (score) | 100 | 101 | 98 | 103 | 105 | 104 | 102 | 102 |

TABLE 2

|  | Ex. 6 | Ex. 7 | Ex. 8 | Ex. 9 |
|---|---|---|---|---|
| First edge length L3/first shoulder land portion width W5 (%) | 43 | 43 | 43 | 43 |
| Second edge length L4/first shoulder land portion width W5 (%) | 17 | 17 | 17 | 17 |
| First inclined surface width W1 (mm) | 1.5 | 2.0 | 2.5 | 3.0 |
| Second inclined surface width W2 (mm) | 2.5 | 2.0 | 1.5 | 1.3 |
| Steering stability (score) | 109 | 107 | 106 | 105 |
| Wet performance (score) | 103 | 103 | 102 | 102 |

As a result of the test, it is confirmed that the tires of the examples can significantly improve steering stability. In addition, the tires of the examples can improve grip performance due to the uniform contact pressure. It is also confirmed that the tires of the examples can improve wet performance.

ADDITIONAL NOTE

The present disclosure includes the following aspects.

Note 1

A tire comprising:

a tread portion comprising a first tread edge, a first shoulder circumferential groove extending in a tire circumferential direction adjacent to the first tread edge, and a first shoulder land portion demarcated by the first shoulder circumferential groove to include the first tread edge, wherein the first shoulder land portion is provided with a plurality of first shoulder lateral grooves extending from the first shoulder circumferential groove to at least the first tread edge, at least one of the plurality of first shoulder lateral grooves comprises a first groove wall and a second groove wall which face each other and extend in a tire radial direction, and a tie-bar in which a groove bottom portion raises locally, the tie-bar comprises an outer surface extending along a ground contact surface of the first shoulder land portion, the outer surface being connected to the first groove wall and the second groove wall, and the outer surface comprises a first edge connected to the first groove wall, and a second edge connected to the second groove wall, the second edge having a length smaller than a length of the first edge.

Note 2

The tire according to note 1, wherein
the at least one of the plurality of first shoulder lateral grooves is provided with chamfer portions,
the chamfer portions comprise a first inclined surface extending from the ground contact surface to the first groove wall, and a second inclined surface extending from the ground contact surface to the second groove wall, and
in a tread plan view, a maximum width of the second inclined surface is greater than a maximum width of the first inclined surface.

Note 3

The tire according to note 2, wherein
the maximum width of the second inclined surface is of from 2.0 to 3.0 times the maximum width of the first inclined surface.

Note 4

The tire according to note 2 or 3, wherein
an inclination angle of the second inclined surface with respect to a tire normal line is greater than an inclination angle of the first inclined surface with respect to a tire normal line.

Note 5

The tire according to any one of notes 1 to 4, wherein
the tie-bar is provided on an end of the at least one of the plurality of first shoulder lateral grooves on a first shoulder circumferential groove side.

Note 6

The tire according to any one of notes 1 to 5, wherein
in a tread plan view, the outer surface of the tie-bar has a trapezoidal shape.

Note 7

The tire according to any one of notes 1 to 6, wherein
the length of the second edge is in a range from 30% to 50% of the length of the first edge.

Note 8

The tire according to any one of notes 1 to 7, wherein
an area of the outer surface of the tie-bar is in a range from 20% to 30% of an opening area of the at least one of the plurality of first shoulder lateral grooves between the first tread edge and the first shoulder circumferential groove.

Note 9

The tire according to any one of notes 1 to 8, wherein
the at least one of the plurality of first shoulder lateral grooves is provided with a groove bottom sipe opening at the outer surface of the tie-bar.

The invention claimed is:

1. A tire comprising:
a tread portion comprising a first tread edge, a first shoulder circumferential groove extending in a tire circumferential direction adjacent to the first tread edge, and a first shoulder land portion demarcated by the first shoulder circumferential groove to include the first tread edge, wherein
the first shoulder land portion is provided with a plurality of first shoulder lateral grooves extending from the first shoulder circumferential groove to at least the first tread edge,
at least one of the plurality of first shoulder lateral grooves comprises a first groove wall and a second groove wall which face each other and extend in a tire radial direction, and a tie-bar in which a groove bottom portion raises locally,
the tie-bar comprises an outer surface extending along a ground contact surface of the first shoulder land portion, the outer surface being connected to the first groove wall and the second groove wall,
the outer surface comprises a first edge connected to the first groove wall, and a second edge connected to the second groove wall, the second edge having a length smaller than a length of the first edge, and
the length of the second edge is in a range from 30% to 50% of the length of the first edge.

2. The tire according to claim 1, wherein
the at least one of the plurality of first shoulder lateral grooves is provided with chamfer portions,
the chamfer portions comprise a first inclined surface extending from the ground contact surface to the first groove wall, and a second inclined surface extending from the ground contact surface to the second groove wall, and
in a tread plan view, a maximum width of the second inclined surface is greater than a maximum width of the first inclined surface.

3. The tire according to claim 2, wherein the maximum width of the second inclined surface is 2.0 to 3.0 times the maximum width of the first inclined surface.

4. The tire according to claim 3, wherein an inclination angle of the second inclined surface with respect to a tire normal line is greater than an inclination angle of the first inclined surface with respect to a tire normal line.

5. The tire according to claim 3, wherein the tie-bar is provided on an end of the at least one of the plurality of first shoulder lateral grooves on a first shoulder circumferential groove side.

6. The tire according to claim 3, wherein in a tread plan view, the outer surface of the tie-bar has a trapezoidal shape.

7. The tire according to claim 2, wherein an inclination angle of the second inclined surface with respect to a tire normal line is greater than an inclination angle of the first inclined surface with respect to a tire normal line.

8. The tire according to claim 7, wherein the tie-bar is provided on an end of the at least one of the plurality of first shoulder lateral grooves on a first shoulder circumferential groove side.

9. The tire according to claim 7, wherein in a tread plan view, the outer surface of the tie-bar has a trapezoidal shape.

10. The tire according to claim 2, wherein the tie-bar is provided on an end of the at least one of the plurality of first shoulder lateral grooves on a first shoulder circumferential groove side.

11. The tire according to claim 2, wherein in a tread plan view, the outer surface of the tie-bar has a trapezoidal shape.

12. The tire according to claim 1, wherein the tie-bar is provided on an end of the at least one of the plurality of first shoulder lateral grooves on a first shoulder circumferential groove side.

13. The tire according to claim 12, wherein in a tread plan view, the outer surface of the tie-bar has a trapezoidal shape.

14. The tire according to claim 1, wherein in a tread plan view, the outer surface of the tie-bar has a trapezoidal shape.

15. The tire according to claim 1, wherein an area of the outer surface of the tie-bar is in a range from 20% to 30% of an opening area of the at least one of the plurality of first shoulder lateral grooves between the first tread edge and the first shoulder circumferential groove.

16. The tire according to claim 1, wherein the at least one of the plurality of first shoulder lateral grooves is provided with a groove bottom sipe opening at the outer surface of the tie-bar.

17. The tire according to claim 1, wherein
the tread portion comprises a first middle land portion adjacent to the first shoulder land portion via the first shoulder circumferential groove,
the first middle land portion is provided with a plurality of first middle shallow grooves extending from the first shoulder circumferential groove and terminate within the first middle land portion,
a total depth of the plurality of first middle shallow grooves is in a range from 70% to 90% of a maximum depth of the first shoulder lateral grooves, and
areas where ends of the respective first shoulder lateral grooves on the first shoulder circumferential groove side are extended parallel to the tire axial direction overlap more than 50% of groove widths of ends of the respective first middle shallow grooves on the first shoulder circumferential groove side.

* * * * *